United States Patent [19]

Pettit, Jr.

[11] Patent Number: 5,008,335

[45] Date of Patent: Apr. 16, 1991

[54] POWDER COATING COMPOSITIONS OF POLYEPOXIDES, ACRYLIC COPOLYMERS AND ALIPHATIC OR POLYESTER DIBASIC ACIDS

[75] Inventor: Paul H. Pettit, Jr., Allison Park, Pa.

[73] Assignee: PPG Industries, Inc., Pittsburgh, Pa.

[21] Appl. No.: 471,758

[22] Filed: Jan. 29, 1990

Related U.S. Application Data

[60] Division of Ser. No. 31,293, Mar. 26, 1987, Pat. No. 4,921,913, Continuation of Ser. No. 763,377, Aug. 7, 1985, abandoned.

[51] Int. Cl.$^5$ .............. C08L 33/02; C08L 63/02; C08L 63/04
[52] U.S. Cl. .................... 525/111; 525/119; 525/934
[58] Field of Search .............. 525/119, 934, 111

[56] References Cited

U.S. PATENT DOCUMENTS

| | | | |
|---|---|---|---|
| 3,247,287 | 4/1966 | Masters et al. | 525/111 |
| 4,021,504 | 5/1977 | Conrad et al. | 525/119 |
| 4,100,221 | 7/1978 | Passalenti et al. | 525/111 |
| 4,237,242 | 12/1980 | Frankel | 525/119 |
| 4,419,495 | 12/1983 | Davis | 525/119 |
| 4,499,239 | 2/1985 | Murakami et al. | 525/111 |

FOREIGN PATENT DOCUMENTS

| | | | |
|---|---|---|---|
| 0029008 | 5/1981 | European Pat. Off. | 525/111 |
| 57-102919 | 6/1982 | Japan | 525/119 |

Primary Examiner—Melvyn I. Marquis
Assistant Examiner—R. E. Sellers
Attorney, Agent, or Firm—Daniel J. Long; Bruce H. Cottrell

[57] ABSTRACT

A thermosetting powder coating composition and a coated article are disclosed. The composition comprises a coreactable particulate mixture of an acid group-containing acrylic polymer and a compatible epoxy novolac resin and an incompatible epoxy resin. The compositions have a good balance of properties and are useful as coatings for appliance, general industrial and automotive applications.

2 Claims, No Drawings

POWDER COATING COMPOSITIONS OF POLYEPOXIDES, ACRYLIC COPOLYMERS AND ALIPHATIC OR POLYESTER DIBASIC ACIDS

This is a division of application Ser. No. 07/031,293, filed Mar. 26, 1987, now U.S. Pat. Ser. No. 4,921,913, which is a continuation of application Ser. No. 06/763,377, filed Aug. 7, 1985, now abandoned.

BACKGROUND OF THE INVENTION

1. Field of the Invention

The present invention relates to thermosetting powder coating compositions, and more particularly to powder coating compositions based on acrylic copolymers and polyepoxides.

2. Brief Description of the Prior Art

Powder coating compositions for use in painting of surfaces are extremely desirable. Such coating compositions greatly reduce and can even eliminate the organic solvents used in liquid paint compositions. When the powder coating composition is cured by heating, little if any volatile material is given off to the surrounding environment. This is a significant advantage over liquid paint compositions in which organic solvent is volatilized into the surrounding atmosphere when the coating composition is cured by heating.

The present invention provides powder coating compositions which have a superior balance of properties relative to the commercially available powder coating compositions. The powder coating compositions of the present invention provide a resultantly cured coating which is hard and glossy, has good adhesion, flexibility and impact resistance, along with good resistance to salt spray, caustic and organic solvents.

SUMMARY OF THE INVENTION

In accordance with the present invention, a thermosetting powder coating composition comprising a coreactable particulate mixture of ingredients is disclosed. The mixture comprises:

(A) an acid group-containing acrylic copolymer having a glass transition temperature in the range of 40° C. to 100° C. and a number average molecular weight of 1500 to 20,000, (B) an epoxy novolac resin which is compatible with (A), and (C) an epoxy resin which has a number average molecular weight of at least 1000 and which is incompatible with (A).

DETAILED DESCRIPTION

The powder coating compositions of the present invention comprise an intimate mixture of several materials. One material of the mixture is an acid group-containing acrylic polymer having a number average molecular weight of 1500 to 20,000, preferably 2000 to 20,000 and a glass transition temperature (Tg) in the range of 40° C. to 100° C., preferably 50° C. to 80° C. The acrylic polymer provides for hardness, gloss and solvent resistance in the resultant coating.

The molecular weights of the acrylic polymers are determined by gel permeation chromatography (GPC) using a polystyrene standard. Therefore, it is not the actual molecular weight which is measured but an indication of the molecular weight as compared to polystyrene. The values which are obtained are commonly referred to as polystyrene numbers; however, for the purpose of this application, they are referred to as molecular weights.

If the number average molecular weight is below 1500, the solvent resistance and mechanical strength of the coating is poor. Molecular weights higher than 20,000 are undesirable because the melt flow of the polymer is poor resulting in a rough coating.

The Tg of the polymer is a measure of hardness and melt flow of the polymer. The higher the Tg, the less the melt flow and the harder the coating. Tg is described in *Principles of Polymer Chemistry* (1953), Cornell University Press. The Tg can be actually measured or it can be calculated as described by Fox in *Bull. Amer. Physics Soc.* 1, 3, page 123 (1956). Tg as used herein refers to the calculated values unless the value cannot be calculated, and in this instance the Tg refers to the actually measured values. For measurement of the Tg of the polymer, Differential Scanning Calorimetry can be used (rate of heating 10° C. per minute, Tg taken at the first inflection point).

If the glass transition temperature is below 40° C., the powder tends to be sticky and difficult to handle. If the glass transition temperature is greater than 100° C., the melt flow of the polymer is too low and the coating will have poor appearance.

The acid group-containing acrylic polymer is preferably a carboxylic acid group-containing acrylic polymer and can be formed by reacting a polymerizable alpha, beta-ethylenically unsaturated carboxylic acid with one or more other polymerizable alpha, beta-ethylenically unsaturated monomers, particularly vinyl aromatic monomers and esters of alpha, beta-ethylenically unsaturated carboxylic acids.

Examples of the carboxylic acid group-containing monomers which can be used are acrylic acid and methacrylic acid, which are preferred, as well as crotonic acid, itaconic acid, fumaric acid, maleic acid, citraconic acid, and the like, as well as monoalkyl esters of unsaturated dicarboxylic acids such as itaconic acid, fumaric acid, maleic acid, citraconic acid, and the like. The acid group-containing monomer is preferably present in the polymer in amounts of about 3 to 25 percent, more preferably from about 5 to 20 percent by weight based on total weight of the monomers. Amounts less than 3 percent result in poorer solvent resistance and poorer mechanical strength of the coating.

Examples of vinyl aromatic compounds are monofunctional vinyl aromatic compounds such as styrene which is preferred, toluene and alkyl-substituted styrenes such as toluene and chloro-substituted styrene such as chlorostyrene. The vinyl aromatic monomer is preferably present in the composition in amounts of about 25 to 75, more preferably from about 40 to 75 percent by weight based on total weight of the monomers. Amounts less than 25 percent result in poor detergent resistance, whereas amounts greater than 75 percent result in poor flexibility.

Examples of the esters of the alpha, beta-ethylenically unsaturated acids are esters of acrylic and methacrylic acid and include methyl methacrylate, ethyl acrylate, butyl acrylate, 2-ethylhexyl acrylate, dodecenyl acrylate, methyl methacrylate, ethyl methacrylate, N-butyl methacrylate, and 2-ethylhexyl methacrylate. Preferably, these esters are present in amounts of about 5 to 70, more preferably from about 10 to 50 percent by weight, based on total weight of the monomers. Amounts less than 5 percent result in brittle coatings, whereas amounts greater than 70 percent result in poor detergent resistance.

In addition to the vinyl aromatic compounds and the esters of acrylic and methacrylic acid, other ethylenically unsaturated copolymerizable monomers may be used. Examples include nitriles such as acrylonitrile, vinyl and vinylidene halides such as vinyl chloride and vinylidene fluoride and vinyl esters such as vinyl acetate. These additional monomers are present in amounts of about 0 to 40, preferably from 0 to 30 percent by weight based on total weight of monomers.

In preparing the acid group-containing acrylic polymer, the various monomers are mixed together and are reacted by conventional free radical initiated polymerization processes. Among the free radical initiators which may be used are benzoyl peroxide, tertiary-butyl hydroperoxide, ditertiarybutyl peroxide, azobis(2-methylpropionitrile), and so forth. The polymerization is preferably carried out in solution using a solvent in which the monomers are soluble such as toluene or xylene. At the completion of the polymerization, the reaction mixture can be devolatilized such as by placing under vacuum to remove the organic solvent and recovering the polymer as a solid material. Alternately, the polymer can be precipitated and subsequently dried. Usually, the devolatilized polymer will contain less than 1 percent by weight of materials that volatilize at the temperatures used for curing the coatings.

The acid group-containing acrylic polymer can also be prepared by emulsion polymerization, suspension polymerization, bulk polymerization or suitable combinations thereof. These techniques are well known in the art.

The acid group-containing acrylic polymer is preferably used in amounts of about 40 to 80, more preferably 50 to 70 percent by weight based on weight of resin solids. Amounts less than 40 percent by weight are not preferred because of poor heat and color stability, whereas amounts greater than 80 percent by weight result in poor flexibility and corrosion resistance.

Besides the carboxylic acid group-containing copolymer, the thermosetting powder coating composition of the invention preferably contains another acid group-containing material which is either a dibasic acid derived from a $C_4$ to $C_{20}$ aliphatic dicarboxylic acid or a carboxylic acid group-terminated polyester. These particular materials are desirable because they provide flexibility and impact resistance in the resultant coating. Among the aliphatic dicarboxylic acids which may be used include adipic acid, subaric acid, azelaic acid, sebacic acid, and dodecanedioic acid. Preferably, the aliphatic dicarboxylic acid is a solid at room temperature.

Among the carboxylic acid group-containing polyesters which may be used are those based on condensing aliphatic dihydric alcohols with aliphatic and/or aromatic dicarboxylic acids. Examples of suitable aliphatic dihydric alcohols include ethylene glycol, propylene glycol, butylene glycol, 1,6-hexylene glycol, neopentyl glycol and the like. Suitable polycarboxylic acids include succinic acid, adipic acid, azelaic acid, sebacic acid, phthalic acid, tetrahydrophthalic acid, hexahydrophthalic acid and the like. These materials are preferably solid materials at room temperature and are commercially available from manufacturers such as Ciba Geigy Corporation under the trademark ARAKOTE resins, particularly ARAKOTE 3001.

The amount of aliphatic dicarboxylic acid or carboxylic acid group-terminated polyester ranges from 0 to 30, preferably 1 to 25 percent by weight based on weight of resin solids. Amounts greater than 30 percent by weight result in poor chemical resistance.

Besides the acid group-containing materials, the thermosetting powder coating compositions also contain an epoxy component which is a blend of two epoxy resins, an epoxy novolac resin which is compatible with the acid group-containing acrylic polymer and an epoxy resin which is incompatible with the acid group-containing acrylic polymer. Compatibility is determined by blending about 70 percent by weight of the acid group-containing acrylic polymer with 30 percent by weight of the particular epoxy and drawing down on a glass panel. The incompatible epoxy resins will be evidenced by a translucence or opaqueness in the coating, whereas the compatible epoxy resin will give a clear coating.

The epoxy novolac resin provides for good chemical resistance as well as resistance to caustic and various detergents. The epoxy novolac resins are well known in the art and in general have the following structure:

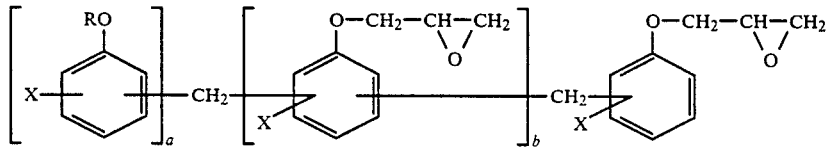

where $a = 0.1$ to 5; $b = 1.5$ to 10; R is derived from chlorohydrins, glycols and/or polyglycols and X is H or alkyl such as methyl. The preferred epoxy novolac resins are epoxy-cresol novolac resins. These materials are commercially available materials such as those available from the Ciba Geigy Corporation as ARALDITE EPN which are epoxy novolac resins based on phenol and ARALDITE ECN which are epoxy novolac resins based on cresol. Specific examples of such materials are ARALDITE EPN 1138, ARALDITE ECN 1235, 1273, 1280 and 1299.

These products typically have epoxy functionalities greater than 2.2, preferably of about 2.5 to 10 and number average molecular weights of about 500 to 1400.

Preferably, the amount of epoxy novolac resins present in the coating composition is about 5 to 30, more preferably 10 to 20 percent by weight based on weight of resin solids. Amounts less than 5 percent by weight result in poor chemical and corrosion resistance, whereas amounts greater than 30 percent by weight result in poor flexibility.

The incompatible epoxy resin provides flexibility and impact resistance to the resultant coating. Preferably, this resin is a polyglycidyl ether of a glycol, a polyglycol, or a polyhydric phenol including mixtures thereof. Preferably, these materials will have number average molecular weights of at least 1000, more preferably 1500 or more. These materials are obtained by reacting a halohydrin such as epichlorohydrin with the glycol, polyglycol or polyhydric phenol in the presence of alkali. Among the glycols, polyglycols and phenols which may be used are ethylene glycol, propylene glycol, polypropylene glycol and bis(4-hydroxyphenyl)-2,2-propane which is preferred.

Also, rubber-modified epoxy resins such as the aforementioned polyglycidyl ethers of glycols, polyglycols and polyhydric phenols further reacted with a carboxylic acid group-containing polymer of butadiene or copolymer of butadiene with a copolymerizable monomer such as acrylonitrile can be used. Materials of this sort are commercially available from the B. F. Goodrich Company under the trademark HYCAR, carboxy-terminated liquid polymers. The use of rubber-modified epoxy resins is preferred.

Preferably, the incompatible epoxy resin is present in the coating composition in amounts of about 5 to 30, more preferably 10 to 20 percent by weight based on weight of resin solids. Amounts less than 5 percent by weight result in poor impact resistance, whereas amounts greater than 30 percent by weight result in poor chemical resistance.

A plasticizer may be used in the powder coating composition and examples include low molecular weight polyepoxides such as the polyglycidyl ethers of glycols and polyhydric phenols such as 1,4-butanediol and bisphenol A. The plasticizers typically will have molecular weights less than 500 and are used in amounts of 0 to 10, preferably 2 to 5 percent by weight based on weight of resin solids.

Besides the weight percentages of the various ingredients in the coating composition, the equivalent ratio of carboxylic acid groups to epoxide groups is preferably within the range of about 1.5 to 0.5:1, preferably 1.2 to 0.8:1. Ratios greater than 1.5:1 and less than 0.5:1 result in poor alkali and chemical resistance.

The coating compositions in accordance with the present invention may include a small percentage of catalyst in order to increase the crosslinking rate of the powder coating composition. Baking temperatures will ordinarily be within the range of about 250° F. to 350° F. (121 to 177° C.). Suitable catalysts are quaternary ammonium salts, quaternary phosphonium salts, phosphines, imidazoles and metal salts. Examples include tetrabutylammonium chloride, bromide or iodide, ethyltriphenyl phosphonium acetate, triphenylphosphine, 2-methyl imidazole and dibutyltin dilaurate. The catalyst is preferably present in the composition in amounts of about 0 to 5, preferably about 0.2 to 2 percent by weight based on weight of resin solids.

In order to give the powder coating composition a suitable color, a pigment can be included in the coating composition typically in amounts of from about 1 to 50 percent by weight based on total weight of the powder coating composition. Pigments which are suitable for powder coating compositions include basic lead silica chromate, titanium dioxide, ultramarine blue, phthalocyanine blue, phthalocyanine green, carbon black, black iron oxide, chromium green oxide, ferrite yellow and quindo red.

The coating composition may also contain certain other additives that are typically incorporated into powder coating compositions. Particularly recommended are anti-popping agents which allow volatiles to escape from the film during baking and flow control agents which prevent cratering of the finish. Benzoin is a highly preferred anti-popping agent and, when used, is present in an amount ranging from about 0.5 percent by weight to 3 percent by weight based on total weight of the coating composition.

One group of suitable flow control agents are acrylic polymers such as polylauryl acrylate, polybutyl acrylate, poly(2-ethylhexyl)acrylate, poly(ethyl-2-ethylhexyl)acrylate, polylauryl methacrylate and polyisodecenyl methacrylate. The flow control agent may also be fluorinated polymers such as esters of polyethylene glycol or polypropylene glycol and fluorinated fatty acids. For example, an ester of polyethylene glycol of molecular weight of over 2500 and perfluorooctanoic acid. Polymeric siloxanes of molecular weights over 1000 may also be used as a flow control agent, for example, poly(dimethylsiloxane) or poly(methylphenyl)siloxane.

The flow control agent, when used, is present in amounts of 0.05 to 5 percent by weight based on total weight of the coating composition.

The thermosetting powder composition is prepared by blending the ingredients of the coating composition in a high shear mixer such as a planetary mixer and then melt blending the resultant mixture in an extruder at a temperature of about 80° C. to 120° C. The extrudate is then cooled and ground so as to pass through a 100-mesh sieve. The powder coating composition can then be applied directly to metal, glass, plastic, or fiber-reinforced plastic substrates. Application of the powder can be by electrostatic spraying or by the use of a fluidized bed. Preferred is electrostatic spraying wherein a negative charge of 200 to 100 kilovolts is applied to the spray gun. The powder composition can be applied either in one pass or in several passes to provide a film thickness after cure of about 0.5 to 5 mils. Preferably to provide a high quality finish of reasonable cost, the thickness of the powder coat is about 1.2 to 4 mils and preferably 1.4 to 3 mils.

The substrate to be coated can optionally be preheated prior to application of the powder to promote more uniform powder deposition. Upon application of the powder, the powder coated substrate is baked at 250° F. to 350° F. (121° C. to 177° C.) for 20 to 60 minutes. The present invention will be more fully understood from the following illustrative examples wherein all quantities, percentages and ratios are on a weight basis unless otherwise indicated.

EXAMPLES

The following examples (A-B) show the preparation of various acid group-containing acrylic polymers.

Example A

A carboxylic acid group-containing acrylic polymer was prepared from styrene, butyl acrylate and acrylic acid (74/14/12 weight ratio) as follows:

| Ingredients | Parts by Weight (grams) |
|---|---|
| Kettle Charge | |
| Xylene | 1060.5 |
| Initiator Charge | |
| Ditertiarybutyl peroxide | 37.1 |
| Xylene | 41.3 |
| Monomer Charge I | |
| Styrene | 219.9 |
| Butyl acrylate | 50.3 |
| Acrylic acid | 16.8 |
| Mercaptopropionic acid | 0.83 |
| Monomer Charge II | |
| Styrene | 573.6 |
| Butyl acrylate | 125.8 |
| Acrylic acid | 87.8 |
| Mercaptopropionic acid | 11.5 |

-continued

| Ingredients | Parts by Weight (grams) |
|---|---|
| Monomer Charge III | |
| Styrene | 593.9 |
| Butyl acrylate | 85.8 |
| Acrylic acid | 97.6 |
| Mercaptopropionic acid | 11.5 |
| Monomer Charge IV | |
| Xylene | 71 |
| Acrylic acid | 30.0 |
| Post Addition | |
| Sebacic acid | 82.2 |
| MODAFLOW[1] | 18.8 |

[1] Poly(2-ethylhexyl-ethyl) acrylate available from Monsanto Company.

The Kettle Charge was heated to reflux under a nitrogen atmosphere in a glass flask equipped with a mechanical stirrer, condenser and addition funnels. Monomer Charge I and the Initiator Charge were added to the reaction vessel simultaneously. Monomer Charge I was complete in about 30 minutes followed by the start of Monomer Charge II which was completed in about one hour. Monomer Charge III was then started and was completed in about 30 minutes at which time the addition of the Initiator Charge was also completed. Monomer Charge IV was then started and completed in about one hour. Throughout these additions, the reaction temperature was kept at about 134–136° C. The addition funnels were rinsed with 12.5 grams each of xylene and the rinse added to the reaction mixture. At the completion of the additions, the reaction mixture was held at 134–135° C. for about two hours, cooled to 100° C., followed by addition of the sebacic acid and MODAFLOW. The reaction mixture was then heated under vacuum to devolatilize the solvent. The resultant solid reaction product had a solids content of 99.6 percent, a number average molecular weight of 4858 and a Tg of 65.

Example B

A carboxylic acid group-containing acrylic polymer was prepared from styrene, butyl acrylate and methacrylic acid (72/13.6/14.4 weight ratio) as follows:

| Ingredients | Parts by Weight (in grams) |
|---|---|
| Kettle Charge | |
| Xylene | 800.0 |
| Initiator Charge | |
| Ditertiarybutyl peroxide | 37.0 |
| Xylene | 63.0 |
| Monomer Charge | |
| Styrene | 1332.0 |
| Butyl acrylate | 252.0 |
| Methacrylic acid | 266.0 |
| Mercaptopropionic acid | 27.8 |
| Post Addition | |
| Sebacic acid | 81.0 |

The Kettle Charge was heated in a glass reactor as described in Example A under a nitrogen atmosphere to reflux. The Initiator Charge and the Monomer Charge were started and added continuously over the period of about three hours while maintaining the reaction temperature at reflux. At the completion of the additions, the addition funnels were rinsed with 100 grams of xylene and the rinse added to the reaction mixture, followed by holding the reaction mixture at a temperature of about 133° C. for 2 hours. The sebacic acid was then added and the reaction mixture subjected to vacuum to devolatilize the solvent. The resultant solid reaction product had a solids content of 99.8 percent, a number average molecular weight of 4273, and a Tg of 75.

Example C

A carboxylic acid group-containing acrylic polymer from styrene, methyl methacrylate, butyl acrylate and methacrylic acid (49/23/13.6/14.4 weight ratio) was prepared from the following ingredients according to the procedure of Example B.

| Ingredients | Parts by Weight |
|---|---|
| Kettle Charge | |
| Xylene | 800 |
| Initiator Charge | |
| Ditertiarybutyl peroxide | 37.0 |
| Xylene | 63.0 |
| Monomer Charge | |
| Styrene | 900.0 |
| Methyl methacrylate | 432.0 |
| Butyl acrylate | 252.0 |
| Methacrylic acid | 266.1 |
| Mercaptopropionic acid | 27.8 |
| Post Addition | |
| Sebacic acid | 81.0 |

The solid reaction product had a solids content of 99.8, a number average molecular weight of 4500 and a Tg of 75.

The following examples (D and E) show the preparation of various epoxy resins which are incompatible with the acrylic polymers described above.

Example D

A polyglycidyl ether of polypropylene glycol was terminated with bisphenol A and then chain extended with the diglycidyl ether of bisphenol A in the following charge ratio:

| Ingredients | Parts by Weight (in grams) |
|---|---|
| DER 736[1] | 596.1 |
| Bisphenol A | 1013.1 |
| Ethyltriphenyl phosphonium iodide | 1.2 |
| EPON 828[2] | 1390.8 |

[1] Polyglycidyl ether of polypropylene glycol having an epoxide equivalent weight of 175–205, commercially available from the Dow Chemical Company.
[2] Diglycidyl ether of bisphenol A having an epoxide equivalent weight of about 188, commercially available from the Shell Chemical Company.

The DER 736, bisphenol A and ethyltriphenyl phosphonium iodide were charged to a suitable reaction vessel and heated to 130° C. to initiate an exotherm. The reaction mixture was kept at reflux until an essentially infinite epoxide equivalent weight was obtained. The reaction mixture was then cooled to 106° C. and the EPON 828 added, followed by heating the reaction mixture to 160° C. to initiate an exotherm. The reaction mixture was kept at about 160–182° C. for about 90 minutes until the reaction mixture had an epoxide equivalent weight of 2420. The reaction mixture was then cooled to room temperature.

Example E

A rubber-modified epoxy resin was prepared by chain extending a polyglycidyl ether of bisphenol A with a carboxylated terminated poly(butadiene-acrylonitrile) copolymer as follows:

| Ingredients | Parts by Weight (in grams) |
|---|---|
| ARALDITE GT 7014[1] | 2100 |
| CTBN[2] | 900 |
| Tributylamine | 3.0 |

[1] Polyglycidyl ether of bisphenol A having an epoxy equivalent weight of 715-800, commercially available from Ciba-Geigy Corp.
[2] Carboxylated copolymer of butadiene and acrylonitrile having a number average molecular weight of 3600, a functionality of 1.8 and available from B. F. Goodrich Company as 1300X8.

The GT 7014 was melted in a suitable reaction vessel under a nitrogen atmosphere. The CTBN and tributylamine were added to the reaction mixture and the mixture heated to 140° C. The reaction mixture was held at this temperature until an acid number of 0.2 was obtained. The resultant product had an epoxide equivalent weight of 1007.

The following examples (1-6) show the formulation of various powder coating compositions and their application to metal substrates.

Example 1

A powder coating composition was prepared from the following mixture of ingredients:

| Ingredients | Parts by Weight (in grams) |
|---|---|
| Carboxylic acid group-containing acrylic polymer of Example A | 1300.0 |
| Azelaic acid | 60.2 |
| Novolac resin premix[1] | 662.0 |
| EPON 828 | 72.2 |
| ARALDITE GT 7013[2] | 281.50 |
| TiO$_2$ | 1805.0 |
| Iron oxide | 1.8 |
| Triphenylphosphine | 17.2 |

[1] Novolac premix was a mixture of 40 percent by weight of an epoxy phenol novolac resin available from Ciba Geigy Corp. as ARALDITE EPN 1138 having an epoxy value of 0.55-0.57, an epoxy equivalent weight of 176-181 and an average functionality of 3.6 and 60 percent by weight of ARALDITE GT 7014.
[2] Polyglycidyl ether of bisphenol A having an epoxy equivalent weight of 640-735 available from the Ciba-Geigy Corp. The epoxy resin was incompatible with the acrylic polymer of Example A.

The ingredients were first blended in a planetary mixer for about 8 minutes, then melt blended in a Barker Perkins Twin Screw Extruder at 110° C., chilled on a chill roll at 20° C., flaked and then grinded in a micromill and sieved through a 100-mesh screen.

The resulting powder composition was then electrostatically sprayed on a grounded steel panel using an electrostatic powder spray gun. After deposition, the panel was heated to 177° C. for 20 minutes. The hard glossy coating had a thickness of 2 to 3 mils, good adhesion to the steel panel and good impact strength. The coating also had excellent corrosion resistance and detergent resistance.

Example 2

A pigmented powder coating composition was prepared from the following mixture of ingredients:

| Ingredients | Parts by Weight |
|---|---|
| Carboxylic acid group-containing acrylic resin of Example A | 481.66 |
| Ethyltriphenyl phosphonium acetate | 17.32 |
| Epoxy-cresol novolac resin[1] | 120.82 |
| ARALDITE GT 7071[2] | 24.16 |
| ARALDITE GT 7013 | 108.4 |
| EPON 828 | 44.3 |
| ORGASOL 2002D[3] | 41.95 |
| Phthalo green | 18.16 |
| Ferrite yellow | 25.04 |
| Lamp black | 6.04 |
| Iron oxide | 130.4 |

[1] Epoxy-cresol novolac resin available from Ciba Geigy Corporation as ECN 9860 having an epoxy value of 0.50 and a softening point of 67° C.
[2] Polyglycidyl ether of bisphenol A commercially available from Ciba Geigy Corporation having an epoxy equivalent weight of 500.
[3] Nylon-12 powder available from Rilsan Industrial Inc.

The above ingredients were formulated into a powder coating composition using the procedure described in Example 1 and electrostatically sprayed on a grounded steel panel and baked for 20 minutes at 350° F. (177° C.). The matte coating had a thickness of 2.5 mils, good adhesion and impact resistance and had excellent alkali resistance and organic solvent resistance.

Example 3

A pigmented powder coating composition was formulated from the following mixture of ingredients:

| Ingredients | Parts by Weight |
|---|---|
| Carboxylic acid group-containing acrylic polymer of Example B | 50.0 |
| Ethyltriphenyl phosphonium acetate concentrate[1] | 2.8 |
| Rubber-modified epoxy resin of Example D | 21.2 |
| ARALDITE GT 7013 | 12.4 |
| EPON 828 | 5.61 |
| ARALDITE ECN 9860[2] | 10.0 |
| Benzoin | 0.51 |
| Iron oxide | 0.3 |
| Ultramarine blue | 0.06 |
| Titanium dioxide | 64.7 |
| MODAFLOW II[3] | 1.0 |

[1] 15 percent by weight ethyltriphenyl phosphonium acetate dissolved in 85 percent by weight of the carboxylic acid group-containing acrylic polymer of Example B.
[2] Epoxy-cresol novolac having an epoxy value of 0.50 available from Ciba Geigy Corp.
[3] Poly(2-ethylhexyl-ethyl) acrylate or silica carrier, 60 percent active, available from Monsanto Co.

The above ingredients were formulated into a powder coating composition using the procedure described in Example 1 and were electrostatically sprayed on a grounded steel panel and baked at 177° C. for 20 minutes. The glossy coating had excellent flexibility and impact resistance and good chemical and detergent resistance.

Example 4

A powder coating was formulated from the following mixture of ingredients:

| Ingredients | Parts by Weight (in grams) |
|---|---|
| Carboxylic acid group-containing acrylic polymer of Example A | 7.8 |
| Carboxylated terminated polyester[1] | 2.0 |
| Novolac premixture[2] | 4.2 |
| Novolac premixture[3] | 1.1 |
| Ethyltriphenyl phosphonium acetate concentrate as used in Example 3 | 0.29 |

[1] Polyester terminated with carboxylic groups, available from Ciba Geigy Corporation as ARAKOTE 3001.
[2] 1/1/1 weight ratio of epoxy-cresol novolac resin commercially available from Ciba Geigy Corporation as ECN 1235:polyglycidyl ether of bisphenol A having an epoxy equivalent weight of 850:epoxy-cresol novolac resin available from Ciba Geigy Corporation as ECN 1273.
[3] 1:1 by weight ratio of ECN 1235 and ECN 1273.

The above ingredients were formulated into a powder coating composition using the procedure described in Example 1, electrostatically sprayed onto a grounded steel panel and baked at 177° C. for 20 minutes. The glossy coating had a thickness of 2.5 mils and good adhesion, impact resistance and flexibility.

Example 5

A clear powder coating formulation was prepared from the following mixture of ingredients:

| Ingredients | Parts by Weight (in grams) |
| --- | --- |
| Carboxylic acid group-containing acrylic polymer of Example A | 65 |
| ECN 1273[1] | 16.0 |
| ECN 1235[2] | 9 |
| Epoxy resin of Example E | 15 |
| Ethyltriphenyl phosphonium acetate concentrate as used in Example 3 | 0.3 |
| Benzoin | 0.5 |

[1]Epoxy-cresol novolac resin having a molecular weight of approximately 1080 and a weight per epoxide of 225, available from the Ciba Geigy Corp.
[2]Epoxy-cresol novolac resin having a molecular weight of approximately 540 and a weight per epoxide of 200, available from the Ciba Geigy Corp.

The above ingredients were formulated into a powder coating composition using the procedure described in Example 1, electrostatically sprayed onto a grounded steel panel and baked at 177° C. for 20 minutes. The glossy coating had a thickness of 2.3 mils, had good adhesion and excellent impact resistance. The coating also had excellent resistance to alkali and organic solvent.

Example 6

A clear powder coating composition was formulated from the following mixture of ingredients:

| Ingredients | Parts by Weight |
| --- | --- |
| Acrylic resin of Example C | 51.34 |
| Ethyltriphenyl phosphonium acetate concentrate as used in Example 3 | 2.5 |
| Epoxy resin of Example E | 19.85 |
| GT 7071 | 7.76 |
| EPON 828 | 5.19 |
| ECN 9860 | 9.28 |
| Benzoin | 0.48 |
| MODAFLOW II | 1.0 |

The above ingredients were formulated into a coating composition using the procedure described in Example 1, electrostatically sprayed on a grounded steel panel and baked at 177° C. for 20 minutes. The glossy coating had a thickness of 2.5 mils, had good adhesion and impact resistance. The coating also had excellent resistance to organic solvents, salt spray and detergents.

I claim:

1. A thermosetting powder coating composition comprising a coreactable particulate mixture of:
   (A) 40 to 80 percent by weight of an acid group-containing acrylic polymer having a glass transition temperature in the range of 40° C. to 100° C., and a number average molecular weight of 1500 to 20,000,
   (B) 5 to 30 percent by weight of an epoxy novolac resin having a number average molecular weight of 500 to 1400 which is compatible with (A), and
   (C) 5 to 30 percent by weight of an epoxy resin which has a number average molecular weight of at least 100 and which is incompatible with (A).

the percentage by weight of (A), (B) and (C) based on weight of resin solids, and which composition also contains a dibasic acid selected from the class consisting of aliphatic dicarboxylic acids containing from 4 to 20 carbon atoms, a polyester terminated with carboxylic acid groups, and mixtures thereof.

2. The composition of claim 1 in which the dibasic acid is selected from the class consisting of sebacic acid, azelaic acid and dodecanedioic acid.

* * * * *

UNITED STATES PATENT AND TRADEMARK OFFICE
CERTIFICATE OF CORRECTION

PATENT NO. : 5,008,335
DATED : April 16, 1991
INVENTOR(S) : Paul H. Pettit, Jr.

It is certified that error appears in the above-identified patent and that said Letters Patent is hereby corrected as shown below:

Column 12, line 33, "100" should be --1000--.

Column 12, line 33, the period after "(A)" should be a comma.

Signed and Sealed this

Twentieth Day of October, 1992

Attest:

DOUGLAS B. COMER

*Attesting Officer*     *Acting Commissioner of Patents and Trademarks*